S. MURTA.
TRACTION ENGINE.
APPLICATION FILED AUG. 8, 1912.
1,083,555.
Patented Jan. 6, 1914.
Fig. I.
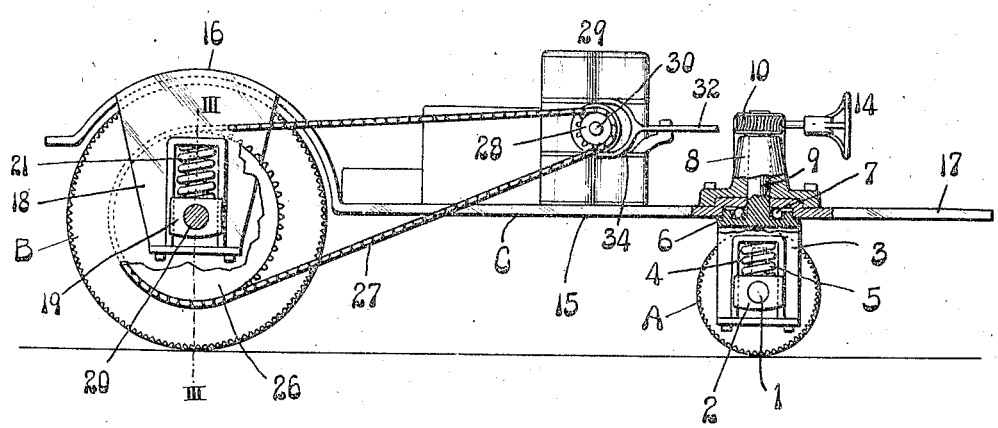
Fig. II.
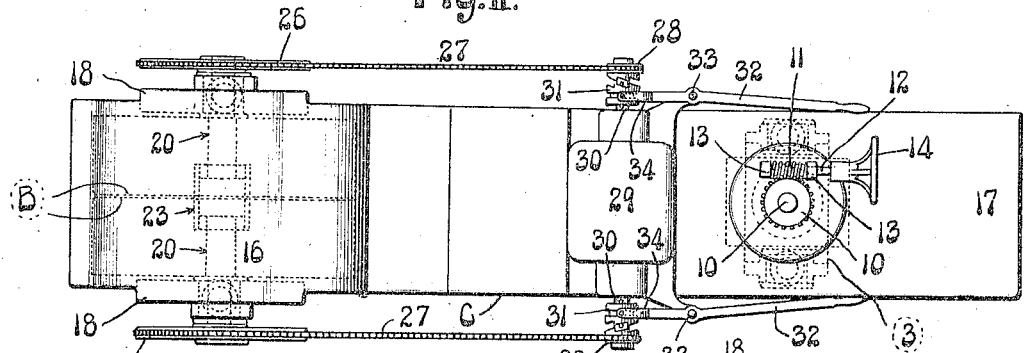
Fig. III.
Attest
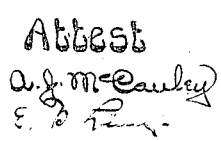
Inventor:
Samuel Murta
by Knight & Cook
Attys.

UNITED STATES PATENT OFFICE.

SAMUEL MURTA, OF ST. LOUIS, MISSOURI.

TRACTION-ENGINE.

1,083,555.   Specification of Letters Patent.   Patented Jan. 6, 1914.

Application filed August 8, 1912. Serial No. 713,997.

*To all whom it may concern:*

Be it known that I, SAMUEL MURTA, a citizen of the United States of America, and a resident of the city of St. Louis, in the State of Missouri, have invented certain new and useful Improvements in Traction-Engines, of which the following is a full, clear, and exact description, reference being had to the accompanying drawings, forming a part of this specification.

My invention relates to a traction engine and has for its object the production of a very simple and efficient engine of this kind, more particularly intended for use on farms as a draft device for wagons and farm implements in general.

Figure I is a side elevation, partly in section, of a traction engine embodying the features of my invention, a portion of one of the drive sprocket wheels being broken away to more clearly show the pedestal. Fig. II is a top or plan view. Fig. III is a vertical section taken approximately on the line III—III, Fig. I.

In the accompanying drawings: A and B designate the steering and drive wheels of my traction engine. The steering wheel A at the rear of the engine is provided with an axle 1 mounted in suitable journal boxes 2.

3 designates a steering wheel fork, the legs of which are located at opposite sides of the steering wheel and contain pockets 4 in which the journal boxes 2 are adapted to play during vertical movement of the steering wheel fork. The steering wheel fork is yieldingly supported by cushion springs 5 located in the pockets 4. The legs of the steering wheel fork are connected by a top piece 6 containing a raceway in which antifriction balls 7 are located, said balls being positioned beneath the rear end of the main frame C of the engine. The main frame is provided with a perforated bearing 8 immediately above the fork 3 and a steering post 9, secured to the fork 3, passes through said bearing. A worm wheel 10 secured to the steering post 9 meshes with a worm 11 on a shaft 12, said shaft being journaled in bearings 13.

14 is a hand wheel attached to the shaft 12 and adapted to be rotated to turn the steering wheel A about the axis of the post 9.

The main frame C is formed of a single casting extending throughout the length of the engine, and comprises a motor platform 15 between the wheels A and B, an arch 16 extending over the driving wheel B and a rear foot platform 17. The main frame also comprises as integral parts thereof pedestals 18, located at opposite sides of the driving wheel sections B and depending from the arch 16. These pedestals contain guideways for journal boxes 19 which receive axle sections 20, and which are surmounted by cushion springs 21, yieldingly supporting the front portion of the main frame. Each axle section 20 extends through a drive wheel section B, and is secured thereto by a key 22, (Fig. III). The inner ends of the axle sections are connected by a sleeve 23 arranged between the drive wheel sections B, and provided with threaded ends for the reception of threaded plugs 24, the axle sections being provided with enlarged ends 25 which are confined within the sleeve by said plugs 24. It will be noted that this sectional wheel and axle construction permits the wheels to be driven independently of each other.

26 designates drive wheels secured to the outer ends of the axle sections 20 and operable by chains 27 passing around small sprocket wheels 28. Any suitable type of motor may be utilized to drive the sprocket wheels 28, and any suitable clutch mechanism may be used to connect the motor to said sprocket wheels. However, to illustrate a means for driving the sprocket wheels independently or collectively, I have shown a motor 29 having a power shaft 30 upon which the sprocket wheels 28 are loosely mounted. Clutch members 31, splined to the shaft 30, are provided with clutch teeth adapted to interlock with clutch teeth on the sides of the sprocket wheels 28. As the clutch members 31 are splined to the shaft 30, they will always rotate with said shaft and the sprocket wheels 28 being loose on the shaft will not rotate therewith unless they are interlocked with the clutch members 31. The clutch members 31 may be shifted into and out of engagement with the sprocket wheels 28 through the medium of ordinary shifter levers 32 pivoted at 33, and provided with the usual yokes 34 which are fitted to the clutch members 31.

The object in dividing the front wheel into two independently movable sections is to permit the traction engine to be turned around at the ends of corn rows, or other places where it must be turned in a small space, and this is accomplished by driving only one of the driving wheel sections and turning the steering wheel A in the proper direction. In the ordinary use of the engine, both drive wheel sections B are operated in unison, and unless it is necessary to make a short turn, the engine may be steered by the steering gear connected to the rear wheel A.

I claim:—

1. In a traction engine, a pair of traction wheels contiguous to each other, a connecting member spanning the space between said traction wheels, an axle in each of said traction wheels rotatable independently of the axle in the other wheel, the said axles being held by said connecting device to limit their longitudinal movement relative to each other.

2. A traction engine having two traction wheel sections, an axle section fixed to each of said traction wheel sections, a sleeve connecting the inner ends of said axle sections, said axle sections being loosely fitted to said sleeve, and drive wheels secured to the outer ends of said axle sections.

3. A traction engine having two traction wheel sections, a sleeve between said traction wheel sections, axle sections passing through and rigidly secured to said traction wheel sections, said axle sections being provided with heads loosely fitted to said sleeve, plugs for retaining said heads within said sleeve, and drive wheels connected to the outer ends of said axle sections.

SAMUEL MURTA.

In the presence of—
A. J. McCAULEY,
E. B. LINN.